(No Model.)
R. B. WALKER.
BANJO.
No. 360,935. Patented Apr. 12, 1887.
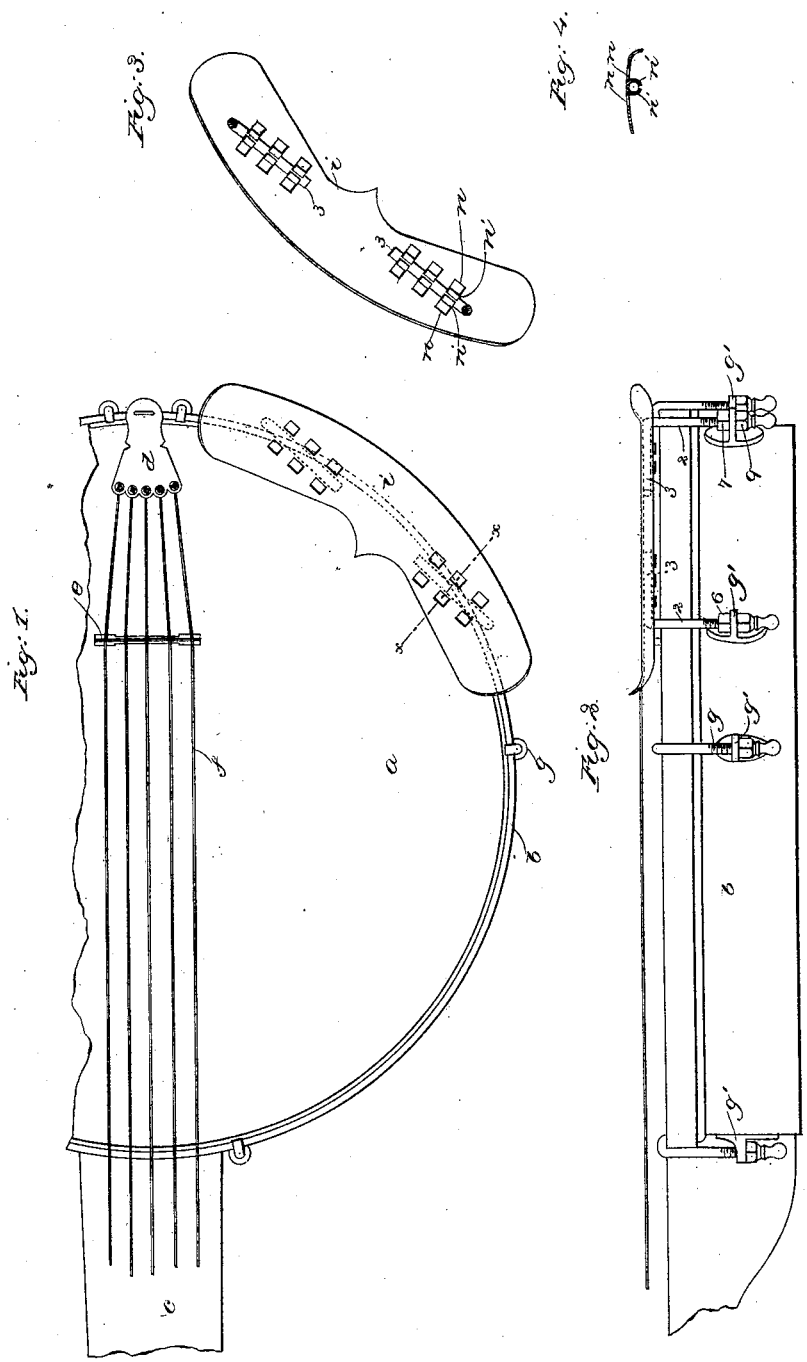
Witnesses.
Thomas Hobday.
John F. C. Prentkert.
Inventor:
Russ. B. Walker
by Crosby & Gregory attys.

UNITED STATES PATENT OFFICE.

RUSS B. WALKER, OF BOSTON, MASSACHUSETTS.

BANJO.

SPECIFICATION forming part of Letters Patent No. 360,935, dated April 12, 1887.

Application filed April 20, 1886. Serial No. 199,482. (No model.)

*To all whom it may concern:*

Be it known that I, RUSS B. WALKER, of Boston, county of Suffolk and State of Massachusetts, have invented an Improvement in Banjos, of which the following description, in connection with the accompanying drawings, is a specification, like letters on the drawings representing like parts.

This invention has for its object to construct an arm or wrist rest or shield which may be applied to a banjo and upon which the arm or wrist may rest while playing, the said rest serving as a shield or protector to prevent perspiration or foreign matter from coming in contact with the head of the banjo.

In accordance with this invention a plate of metal or other suitable material is attached by suitable fastenings to one side of the rim of the banjo adjacent to the tail-piece, the said plate being so located as to project a short distance over the head of but not come in contact with the head or rim of the instrument. The fastenings herein employed consist of two hooked screw-rods, one end of each rod engaging suitable loops or eyes at the under side of the rest, while the shanks of the said rods are extended through ears attached to the rim of the instrument and occupying the position of the usual head straining-bolts, the said rods being held in adjusted position by nuts thereon. The loops or eyes at the under side of the rest are herein shown as formed by cutting the plate through, so as to form a series of clips or tongues, which are turned at right angles to the surface of the plate and then curved toward each other, in order that the ends thereof will meet, or nearly so, (see Figs. 3 and 4,) to form loops for the reception of one arm of each hooked rod.

Figure 1 shows, in face view, a portion of a banjo with an arm or wrist rest applied thereto constructed in accordance with this invention; Fig. 2, a side view of Fig. 1; Fig. 3, an under side view of the arm or wrist rest or shield by itself; and Fig. 4, a cross-section of the same, taken on the dotted line $x\ x$, Fig. 1.

The head $a$, rim $b$, neck $c$, tail-piece $d$, bridge $e$, strings $f$, and screws or bolts $g$, passing through ears $e$, are all and may be of usual construction. A plate, $i$, of metal or other suitable material, and preferably curved to conform to the curvature of the rim $b$, is secured to said rim by suitable fastenings adjacent to the tail-piece $d$, and lying in a plane parallel with the head $a$, so as to project over the said head for a short distance, as shown in Fig. 1.

The fastenings herein shown for attaching the plate $i$ consist of two rods, 2, each of which is bent at substantially a right angle to form a hook or arm, 3. (See full and dotted lines.) The arms 2 of the said rods are screw-threaded to enter suitable ears, $g'$, attached to the side of the rim $b$, said arms being held in position by check-nuts 6 7. The arms 3 of the said rods enter suitable loops or eyes located at the under side of the plate $i$, the said loops or eyes in this instance being formed by cutting several slits opposite to each other, as at $n$, (see Figs. 3 and 4,) and by forcing outward the lips or tongues $n'$ thus formed, and then bending them over toward each other until the ends of the tongues meet, or nearly so. The arms 3 are passed through the loops thus formed and hold the plate $i$ in position, the rods 2 being of sufficient length to hold the plate $i$ above the rim $b$ at any desired height, while the plate $i$ is of sufficient width to project a short distance over the head $a$.

By the rest or shield herein described the musician may rest his arm or wrist thereon while playing, thus preventing the perspiration from coming in contact with the head $a$ and destroying its efficiency, and also preventing any foreign matter—such, for instance, as burnt cork or equivalent material with which the hands of the player may be smeared—from coming in contact with the head and soiling it; also, the shield prevents the sleeve of the player from wearing, as is the case where the sleeve is continually coming in contact with the sharp edge of the rim.

It is obvious that, instead of employing loops or eyes, as described, and bent rods as fastening devices, any other suitable means may be employed by which the plate $i$ may be attached to the body of the instrument, the means employed preferably being adjustable.

I claim—

1. The combination, with a banjo, of an arm or wrist rest and shield, the same consisting of an elongated plate attached to the instrument near the tail-piece thereof, the said plate being curved to correspond to the curvature of the rim, or approximately so, and being supported above the said rim and arranged to project over the head *a* of the banjo, substantially as set forth.

2. The combination, with a banjo, of an arm or wrist rest and shield consisting of a curved plate adjustably secured to the rim of the banjo, but above the same, so as to be out of contact therewith, said rest and shield being arranged to project over, and thus protect the head *a*, substantially as set forth.

3. An arm rest and shield for a banjo, the same consisting of a curved plate having loops or eyes on its under side combined with hooked rods adapted to engage said loops or eyes and to be attached to the rim of the banjo, substantially as set forth.

In testimony whereof I have signed my name to this specification in the presence of two subscribing witnesses.

RUSS B. WALKER.

Witnesses:
G. W. GREGORY,
F. CUTTER.